United States Patent
Jansma

(10) Patent No.: US 7,282,848 B2
(45) Date of Patent: Oct. 16, 2007

(54) FLUORESCENT LAMP HAVING PHOSPHOR LAYER THAT IS SUBSTANTIALLY FREE FROM CALCIUM CARBONATE

(75) Inventor: Jon B. Jansma, Pepper Pike, OH (US)

(73) Assignee: General Electric Company, Schenectady, NY (US)

(*) Notice: Subject to any disclaimer, the term of this patent is extended or adjusted under 35 U.S.C. 154(b) by 502 days.

(21) Appl. No.: 10/443,282

(22) Filed: May 22, 2003

(65) Prior Publication Data
US 2004/0232820 A1    Nov. 25, 2004

(51) Int. Cl.
H01J 61/62    (2006.01)
H01J 63/04    (2006.01)
B05D 5/12    (2006.01)
B05D 5/06    (2006.01)

(52) U.S. Cl. .................. 313/485; 313/486; 313/487; 427/64; 427/67; 445/12; 445/14; 252/301.4 R

(58) Field of Classification Search ........ 313/484–486, 313/498, 493, 503, 502, 489; 445/14, 58, 445/10; 427/157, 156, 64, 67; 252/301.36
See application file for complete search history.

(56) References Cited

U.S. PATENT DOCUMENTS

| | | | |
|---|---|---|---|
| 3,937,998 A | 2/1976 | Verstegen et al. | 313/487 |
| 4,088,923 A | 5/1978 | Manders | 313/487 |
| 4,335,330 A | 6/1982 | Peters et al. | 313/486 |
| 4,340,512 A * | 7/1982 | Schreurs | 523/122 |
| 4,431,941 A | 2/1984 | Roy et al. | 313/487 |
| 4,806,824 A | 2/1989 | Paynter et al. | 313/486 |
| 4,847,533 A | 7/1989 | Hoffman | 313/487 |
| 4,857,798 A * | 8/1989 | Ford | 313/487 |
| 5,045,752 A | 9/1991 | Jansma | 313/487 |
| 5,493,167 A * | 2/1996 | Mikol et al. | 313/25 |
| 5,602,444 A * | 2/1997 | Jansma | 313/489 |
| 5,838,101 A | 11/1998 | Pappalardo | 313/487 |
| 5,844,350 A * | 12/1998 | Scott et al. | 313/25 |
| 6,200,918 B1 * | 3/2001 | Yanagitani et al. | 501/152 |
| 6,683,407 B2 * | 1/2004 | Lisitsyn et al. | 313/489 |
| 2005/0082988 A1 * | 4/2005 | Lunter et al. | 313/639 |

* cited by examiner

Primary Examiner—Mariceli Santiago
(74) Attorney, Agent, or Firm—Pearne & Gordon LLP

(57) ABSTRACT

A mercury vapor discharge fluorescent lamp is provided having a phosphor layer that has a yttria-based red emitting rare earth phosphor. The phosphor layer is prepared from an aqueous phosphor slurry that is coated onto the inner surface of the glass envelope of the lamp, then baked in a lehring oven to vaporize or decompose non-phosphor components of the slurry to leave behind the finished phosphor layer. The phosphor slurry contains a non-ionizing thickener, preferably polyethylene oxide, but does not contain any calcium carbonate or carbonate salts. The phosphor layer includes a yttria-based red emitting rare earth phosphor.

15 Claims, 1 Drawing Sheet

FLUORESCENT LAMP HAVING PHOSPHOR LAYER THAT IS SUBSTANTIALLY FREE FROM CALCIUM CARBONATE

BACKGROUND OF INVENTION

The present invention relates to fluorescent lamps. More particularly, it relates to fluorescent lamps having a phosphor coating that is substantially carbonate-free.

Fluorescent lamps utilizing a rare earth blended phosphor system are well known in the art. Conventional rare earth phosphor blends are disclosed, e.g., in U.S. Pat. Nos. 5,045,752, 4,088,923, 4,335,330, 4,847,533, 4,806,824, 3,937,998, and 4,431,941. Typically, a rare earth phosphor layer utilizing a conventional rare earth phosphor blend comprises a mixture of red, green and blue emitting rare earth phosphors resulting in a triphosphor mixture.

In the conventional triphosphor system, the particular red, green and blue emitting phosphors, as well as their weight percents, are selected based on their specific color emission characteristics so that when combined, their respective color emissions result in light output of the desired color with suitable color rendering properties (CRI) for the intended application.

The red emitting phosphor is most commonly a yttria-based species, e.g. yttrium oxide activated with europium ($Eu^{3+}$), commonly abbreviated YEO. The green emitting phosphor can be lanthanum phosphate activated with cerium ($Ce^{3+}$) and terbium ($Tb^{3+}$), commonly abbreviated LAP, less preferably cerium, magnesium aluminate activated with terbium ($Tb^{3+}$), commonly abbreviated CAT, still less preferably gadolinium, magnesium pentaborate activated with cerium ($Ce^{3+}$) and terbium ($Tb^{3+}$), commonly abbreviated CBT. The blue emitting phosphor is most commonly calcium-based, such as calcium, strontium, barium chloroapatite activated with europium ($Eu^{2+}$). Less preferably, the blue phosphor can be barium, magnesium aluminate activated with europium ($Eu^{2+}$). Alternatively, other red, green and blue emitting rare earth phosphors are known and could be selected based on operational as well as cost considerations.

In addition to the above-described triphosphor system, rare earth phosphor blends comprising other numbers of rare earth phosphors, such as systems with 4 or 5 rare earth phosphors, are also known and can be used. Still further, phosphor layers having a mixture of rare earth phosphors and the less expensive halophosphors can also be used.

In virtually all rare earth phosphor blends, as well as blends containing both rare earth and halophosphors, it is necessary or desirable to include a red emitting rare earth phosphor. As described above the most common red emitting rare earth phosphors are yttria-based. Though other red emitting rare earth phosphors are known, the yttria species of phosphors are highly preferred due to their excellent red color emitting characteristics, including color intensity and resulting CRI in the red spectrum.

The process for making a fluorescent lamp involves coating the interior surface of the lamp's glass envelope with a slurry of the desired phosphors. Then the slurry is dried or heated to decompose or vaporize liquid slurry components leaving behind the dried coating of phosphors.

The slurry is prepared as an aqueous slurry suspension of the phosphors (which are generally provided in powdered form). The aqueous slurry must have sufficient viscosity to effectively and uniformly coat the interior surface of the glass envelope prior to drying. Conventionally, acrylic thickeners containing carboxylic acid (COOH) groups are used to elevate and regulate the slurry viscosity. However, when yttria-based rare earth phosphors are used, the slightly water-soluble yttria reacts with the COOH groups on the acrylic molecules causing a cross-linking cascade that effectively cross-links the acrylic molecules causing gellation or flocculation of the slurry. The result is that the slurry essentially "gels," and is no longer in a liquid or flowable state.

To avoid the above complication, other polymeric thickeners having no COOH groups are used when yttria-based red phosphors are to be included in the phosphor slurry. In this case, the thickener of choice is polyethylene oxide (PEO). PEO is a highly effective thickener for aqueous systems, and has been used with great success to regulate the viscosity of phosphor slurries for coating onto the glass envelope of a fluorescent lamp. However, PEO conventionally contains trace amounts of carbonate salts, particularly calcium carbonate particles, as a result of the manufacturing process for PEO. Conventionally available PEO contains from 0.2 to about 1 percent calcium carbonate by weight.

The presence of this small amount of calcium carbonate in the PEO thickener has been well known to lamp manufactures, and till now has been believed to be innocuous to lamp production and/or performance. However, the inventor herein has discovered, surprisingly and unexpectedly, that the presence of this small amount of calcium carbonate in the PEO thickener results in calcium carbonate being present in the finished phosphor layer, and causes lower lumen efficiency and lumen maintenance in the finished fluorescent lamp. Accordingly, there is a need in the art for a fluorescent lamp that utilizes yttria-based red emitting rare earth phosphors, yet contains no calcium carbonate in the phosphor layer.

SUMMARY OF THE INVENTION

A fluorescent lamp is provided that has a light-transmissive envelope having an inner surface, means for providing a discharge, a phosphor layer disposed adjacent the inner surface of the envelope, and a fill gas of mercury and an inert gas sealed inside the envelope. The phosphor layer includes a yttria-based red emitting rare earth phosphor, and is substantially free from oxygen-containing species that are or become unstable at a temperature of 800° C. in a manner that produces atomic or molecular oxygen.

Another fluorescent lamp is provided having a light transmissive envelope with an inner surface, means for providing a discharge, a phosphor layer disposed adjacent the inner surface of the envelope, and a fill gas of mercury and an inert gas sealed inside the envelope. The phosphor layer has a yttria-based red emitting rare earth phosphor, and the fluorescent lamp is made by a process having the steps of a) selecting phosphors, including the yttria-based red emitting rare earth phosphor, and combining the phosphors on a dry solid weight basis to form a solid phosphor mixture; b) combining the solid phosphor mixture with a quantity of water and a quantity of a non-ionizing thickener to form an aqueous phosphor slurry, wherein the non-ionizing thickener is substantially free from carbonate salts; c) coating the inner surface of the envelope or an intervening barrier layer with the aqueous phosphor slurry to provide a phosphor slurry coating thereon; and d) baking the coated envelope to vaporize or decompose the non-phosphor components of the slurry and leave behind the phosphors to provide the phosphor layer.

A method of making a fluorescent lamp is also provided having the following steps: a) selecting phosphors, including a yttria-based red emitting rare earth phosphor, and combining the phosphors on a dry solid weight basis to form a solid phosphor mixture; b) combining the solid phosphor mixture with a quantity of water and a quantity of a non-ionizing thickener to form an aqueous phosphor slurry, wherein the non-ionizing thickener is substantially free from oxygen-containing species that are or become unstable at a temperature of 800° C. in a manner that produces atomic or molecular oxygen; c) providing a coating of the aqueous phosphor slurry on or adjacent an inner surface of a lamp envelope; and d) baking the envelope having the phosphor slurry coating thereon to vaporize or decompose non-phosphor components of the phosphor slurry coating and leave behind the phospors to provide the phosphor layer.

DETAILED DESCRIPTION OF THE PREFERRED EMBODIMENTS OF THE INVENTION

Figure 1:
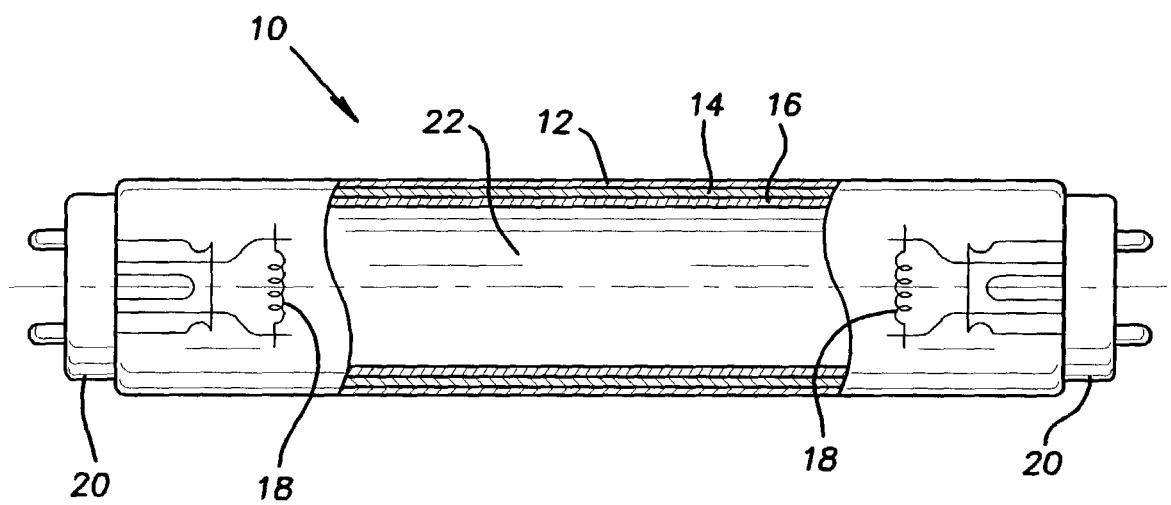
FIG. 1 shows a fluorescent lamp having an improved carbonate-free rare earth phosphor layer according to the invention.

In the description that follows, when a preferred range, such as 5 to 25 (or 5-25), is given, this means preferably at least 5, and separately and independently, preferably not more than 25. As used herein, a "fluorescent lamp" is any mercury vapor discharge fluorescent lamp as known in the art, including fluorescent lamps having electrodes, and electrodeless fluorescent lamps where the means for providing a discharge include a radio transmitter adapted to excite mercury vapor atoms via transmission of an electromagnetic signal. Also as used herein, a "T8 lamp" is a fluorescent lamp as known in the art, preferably linear, preferably nominally 48 inches in length, and having a nominal outer diameter of 1 inch (eight times ⅛ inch, which is where the "8" in "T8" comes from). Less preferably, the T8 fluorescent lamp can be nominally 2, 3, 6 or 8 feet long, less preferably some other length.

FIG. 1 shows a mercury vapor discharge fluorescent lamp 10 according to the present invention. Though the lamp in FIG. 1 is linear, the invention is not limited to linear lamps and may be applied to fluorescent lamps of any shape. The fluorescent lamp 10 has a light-transmissive glass tube or envelope 12 which has a circular cross-section. The lamp is hermetically sealed by bases 20 attached at both ends and, in lamps having electrodes (such as that in FIG. 1), a pair of spaced electrode structures 18 are respectively mounted on the bases 20. A discharge-sustaining fill gas 22 of mercury and an inert gas is sealed inside the glass tube. The inert gas is preferably argon or a mixture of argon and krypton, less preferably some other inert gas or gas mixture. The inert gas and a small quantity of mercury vapor provide the low vapor pressure manner of operation.

Preferably, the mercury vapor has a partial pressure of 4-6 μm Hg, approximately mercury's vapor pressure at 25° C. In the illustrated embodiment, the fluorescent lamp 10 has a barrier layer 14, and a phosphor layer 16. The barrier layer 14 is an optional layer comprising a material that is effective to prevent energized or excited mercury ions from leaching into the glass envelope 12 during lamp operation. Preferably, the barrier layer material is also effective to reflect ultraviolet (UV) radiation back into the phosphor layer 16 to be converted into visible light as known in the art. Suitable barrier layer materials include alumina, such as alumina particles, preferably a mixture of substantially equal proportions of alpha- and gamma-alumina particles. A preferred alumina barrier layer has a coating weight of 0.05-3, preferably about 0.12-0.15, mg/cm$^2$. The alumina particles preferably have a mean particle size of 15-800, preferably 20-600, preferably 20-400, preferably 22-300, preferably 25-200, preferably 30-100, nm.

Less preferably or alternatively, the barrier layer 14 (if present) can be a silica, yttria, hafnia, zirconia, vanadia, or niobia barrier layer, less preferably some combination or mixture thereof.

The phosphor layer 16 preferably is a rare earth phosphor layer, such as a rare earth triphosphor layer known in the art, having red, green and blue emitting rare earth phosphors. The red emitting phosphor is a yttria-based red phosphor, most preferably yttrium oxide activated with europium ($Eu^{3+}$), commonly abbreviated YEO. Most preferably, the green emitting phosphor is lanthanum phosphate activated with cerium ($Ce^{3+}$) and terbium ($Tb^{3+}$), commonly abbreviated LAP, less preferably cerium, magnesium aluminate activated with terbium ($Tb^{3+}$), commonly abbreviated CAT, still less preferably gadolinium, magnesium pentaborate activated with cerium ($Ce^{3+}$) and terbium ($Tb^{3+}$), commonly abbreviated CBT. The blue emitting phosphor is most preferably calcium, strontium, barium chloroapatite activated with europium ($Eu^{2+}$). Less preferably, the blue phosphor can be barium, magnesium aluminate activated with europium ($Eu^{2+}$). Alternatively, other green and blue emitting rare earth phosphors are known and could be selected based on operational as well as cost considerations.

In addition to the rare earth triphosphor system above, the phosphor layer 16 can comprise other numbers of rare earth phosphors, such as two, four or five rare earth phosphors, or even greater than five rare earth phosphors. Further still, the phosphor layer 16 can be a mixture of rare earth phosphors and halophosphors; all that is required is that the phosphor layer 16 include at least one yttria-based red emitting rare earth phosphor. The phosphor layer 16 preferably has a coating weight of 1-5 mg/cm$^2$.

As will be more fully described below, it is critical in the present invention that the phosphor layer 16 be free or substantially free from oxygen-containing species that are or become relatively unstable at temperatures of 800° C. or 900° C. In other words, any (or substantially any) oxygen-containing species present in the phosphor layer must be stable against cracking (molecular decomposition or dissociation of the individual atoms of a molecule) at 800, preferably 810, preferably 820, preferably 830, preferably 840, preferably 850, preferably 860, preferably 870, preferably 880, 890, 900, 920, 940, 960, 980, 1000° C., or higher, that produces or results in atomic or molecular oxygen.

As mentioned above, yttria (used in the yttria-based red emitting phosphor) is slightly soluble in water and produces $Y^{3+}_{(aq)}$. If conventional COOH-containing acrylic thickeners are used in the aqueous phosphor slurry, the COOH groups ionize to produce [acrylic]-COO$^-$ and H$^+$ (or more accurately H$_3$O$^+$) in solution. In the aqueous phosphor slurry, the ionized COO$^-$ moieties react with the highly reactive Y$^{3+}$ ions effectively resulting in crosslinking the acrylic molecules which causes the entire slurry to gel. This is the reason that the conventional acrylic thickeners cannot be used when yttria-based red emitting rare earth phosphors are included in the phosphor slurry. It is believed that a similar crosslinking effect would be observed for any high molecular weight thickener that ionizes in aqueous solution. Therefore, when using yttria-based red emitting phosphors, the thickener that is selected to regulate slurry viscosity must be a non-ionizing species; i.e. one that is water soluble so that it dissolves in the aqueous slurry, but does not ionize in solution to produce negatively charged moieties with which solvated $Y^{3+}$ ions can react to crosslink the thickener molecules.

The most commonly selected non-ionizing thickener for regulating phosphor slurry viscosity is polyethylene oxide (PEO). Preferably, PEO is added to the aqueous phosphor slurry in a concentration of 1-10, preferably 2-9, preferably 3-8, preferably 4-7, preferably 4.5-6, preferably about 5, weight percent. PEOs are available in a wide range of molecular weights ranging from 1,000 to 100,000 to 1,000,000 g/mol and above, they are substantially nontoxic, and they are relatively inexpensive and commonly available. In addition, PEOs are easily decomposed during the normal baking or lehring process (described below) that is used to dry the phosphor slurry and leave the final phosphor coating (phosphor layer 16) in place on the surface of the glass envelope 12.

The higher molecular weight PEO species (such as 100,000 g/mol and above) used to thicken slurry suspensions are supplied as a fine white solid powder. Conventionally, the PEO powder also contains from 0.2 to about 1 percent by weight calcium carbonate.

To produce the phosphor slurry for a particular application, first the particular phosphors are selected and combined on a dry solid weight basis to form a solid phosphor mixture. This mixture is then added to water, together with other conventional components known in the art, and stirred to achieve substantial uniformity. A thickener is also added to provide sufficient viscosity to the slurry to achieve a stable suspension having uniform distribution of solid phosphor particles throughout the slurry, and also to provide suitable viscosity for uniformly coating the surface of the glass envelope. As already described, when yttria-based red emitting rare earth phosphors are used, the thickener is preferably PEO.

Once the slurry has been prepared, it is used to coat the interior surface of the glass envelope 12 or barrier layer 14 if present. The elevated viscosity of the slurry (preferably at least 1,000, preferably 10,000, preferably 100,000, cP), ensures a substantially uniform coating of the slurry over the coated surface. Once coated with the slurry, the coated glass envelope 12 is subjected to a lehring or baking treatment in a baking oven in order to vaporize or decompose the non-phosphor components of the slurry and leave behind the phosphors to provide the phosphor layer 16. The baking treatment is carried out at about 600° C. for about 30 seconds. Care must be taken during the baking treatment not to raise the temperature significantly above 600° C. because the glass envelope (made from soda-lime glass) begins to melt at about 650° C.

The 600° C. temperature of the baking treatment is sufficient to vaporize the water and decompose the PEO from the phosphor slurry; the phosphors are stable up to 900° C. or more, and are therefore unaffected by the baking treatment. However, calcium carbonate from the PEO (in the calcite crystalline phase) is also left behind in the phosphor layer 16 because calcium carbonate (calcite) does not decompose until about 900° C. The result is that the phosphor layer 16 contains about 0.1-0.5 weight percent calcium carbonate.

It is believed, though not certain, that the calcium carbonate in the PEO is present as a result of the catalytic process used to produce PEO, e.g. that solid calcium carbonate is or forms a component of a catalyst used in the production of PEO, and that the calcium carbonate becomes mixed with the solid PEO product. Both the PEO and calcium carbonate are fine solid white powders, and are therefore not easily separated by physical or mechanical methods.

The presence of calcium carbonate in the phosphor layer has been long known to the fluorescent lamp industry, and has always been believed not to adversely affect lamp performance. However, contrary to this conventional belief, the inventor herein has surprisingly and unexpectedly discovered that the calcium carbonate in the phosphor layer significantly contributes to poor lamp performance.

A test was conducted to compare a conventional fluorescent lamp having a yttria-based red rare earth emitting phosphor in the phosphor layer that was made using the conventional calcium carbonate-containing PEO thickener, with an analogous lamp made in the same way except using calcium carbonate-free PEO according to the invention. Both lamps were T8 fluorescent lamps and were prepared in the conventional manner substantially as described above. Then both lamps were subjected to a test comparing initial lumens, and 1000 hour and 8000 hour lumen maintenance in a side-by-side comparison. In performing the test, both the conventional and invented lamps were subjected to an identical pattern of cyclic starting and stopping out to 8000 hours of total lamp operation, and LPW maintenance were measured and recorded at 1000 hours and 8000 hours respectively. The cyclic starting and stopping was conducted according to Illuminating Engineering Society (IES) standard test method IESNA LM40-2001 in a continuous 3 hours on 20 minutes off cycle. The results are provided below in table 1.

TABLE 1

Comparison of conventional and invented lamps

| Lamp (Type/Color Temp.) | Calcite content of PEO (wt. %) | Initial lumens per watt (LPW) | 1000 hr LPW Maintenance (% of initial LPW) | 8000 hr LPW Maintenance (% of initial LPW) |
|---|---|---|---|---|
| Conventional (F32T8/3500 K) | 0.5 | 94.1 | 97.6 | 92.3 |
| Invented (F32T8/3500 K) | 0.0 | 94.8 | 98.8 | 95.5 |

As used in table 1 and throughout this application, initial lumens per watt (initial LPW) refers to the lumen efficiency of a fluorescent lamp, calculated as the light emitted from the lamp measured in lumens, per watt of power consumed by the lamp, immediately after startup for the first time. Also as used in table 1 and throughout this application, LPW maintenance refers to the ratio of the lumen efficiency of the lamp in lumens-per-watt (LPW) measured at a certain time after startup to the initial LPW; e.g. 1000 hour LPW maintenance in table 1 is the ratio of LPW measured for a fluorescent lamp after 1000 hours of cyclic operation to the initial LPW for that lamp. LPW maintenance provides an indication of a fluorescent lamp's capacity to sustain its initial lumen efficiency over the life of the lamp, reported in percent of initial LPW.

As can be seen from table 1, the invented lamp made using a calcium carbonate-free PEO thickener exhibited a 1000 hour LPW maintenance of 98.8, compared with only 97.6 for the conventional lamp made using PEO that contained 0.5 weight percent calcium carbonate. This represents a 1.2% increase in lumen maintenance at 1000, which is a substantial improvement that resulted solely from omitting calcium carbonate from the PEO thickener. This was an extremely surprising and unexpected result, especially considering that conventional wisdom has been that calcium carbonate in the phosphor layer caused no negative effect on lamp performance. Preferably, a lamp according to the invention having substantially no calcium carbonate in the phosphor layer 16 has a 1000 hour LPW maintenance of at least 97.8, preferably 98.0, preferably 98.2, 98.4, 98.6, 98.8, 99.0, 99.2, 99.4, 99.6, 99.7, 99.8, or 99.9, percent.

Still referring to table 1, comparison of the 8000 hour lumen maintenance performance between the conventional and invented lamps is even more striking. At 8000 hours, the invented lamp made using calcium carbonate-free PEO exhibited a lumen maintenance of 95.5, compared to only 92.3 for the conventional lamp made using PEO that contained 0.5 weight percent calcium carbonate. The result was a 3.7% improvement in 8000 hour lumen maintenance over the conventional lamp. This substantial improvement was achieved solely by omitting calcium carbonate from the PEO thickener which again has been conventionally believed not to negatively impact lamp performance. Preferably, a lamp according to the invention having substantially no calcium carbonate in the phosphor layer 16 has an 8000 hour LPW maintenance of at least 92.5, preferably 92.6, preferably 92.8, 93.0, 93.2, 93.4, 93.6, 93.8, 94.0, 94.2, 94.4, 94.6, 94.8, 95.0, 95.2, 95.4, 95.6, 95.8, 96.0, 96.2, 96.4, 96.6, 96.8, 97.0, 97.2, 97.4, 97.6, 97.8, or 98.0, percent.

So substantial an improvement in both the 1000 hour and 8000 hour LPW maintenance for the fluorescent lamp according to the invention having no calcium carbonate in the phosphor layer 16 was a highly surprising and unexpected result given the fact that those skilled in the art have long believed calcium carbonate to be benign to lamp performance.

Without wishing to be bound by a particular theory, it is believed that the mechanism of calcium carbonate action proceeds as follows to diminish lamp performance. During operation, the arc discharge between the electrodes 18 can generate temperatures in excess of 800-900° C. in the vapor space within the glass envelope 12. At these temperatures, the calcium carbonate may dissociate or crack resulting in atomic oxygen and/or molecular oxygen in the vapor space within the lamp. At the discharge temperature, the highly excited mercury vapor ions react almost instantaneously with present oxygen to produce mercury oxide (HgO and/or $Hg_2O$), which is a black or brownish solid. This mercury oxide becomes deposited on the interior surface of the envelope 12 resulting in lamp discoloration and lowering the lumen output from the lamp. The reason lumen maintenance worsens over time is that additional mercury oxide is formed and becomes deposited on the lamp envelope 12 as time passes during lamp operation.

In addition to adversely affecting lamp output (total lumens and LPW), the deposition of mercury oxide on the lamp envelope has two additional negative effects. The first is that as the lamp becomes more discolored, it exhibits an increasingly displeasing appearance. Diminished aesthetics can be of significant concern for lamp consumers in certain lighting applications where the fluorescent lamps remain visible in their fixtures. The second, perhaps more significant additional negative effect is that as excited mercury continues to react with oxygen to produce mercury oxides, mercury becomes depleted from the vapor phase and must be replaced by freshly vaporizing mercury from the liquid phase. The consequence of this mercury depletion mechanism is that additional excess liquid mercury must be provided in the fluorescent lamp when it is made to ensure sufficient mercury will be present to replenish oxidized mercury vapor over the lifetime of the lamp. It is clear that the less mercury required in the lamp, the better. Therefore, by omitting calcium carbonate from the PEO thickeners according to the present invention, the quantity of mercury required to be added to fluorescent lamps can be minimized without sacrificing lamp life or performance. In fact, according to the present invention, performance is actually improved in terms of lumen maintenance while still permitting a lower dose of mercury to be provided in the lamp.

The highly energized (unstable) mercury vapor ions from the arc discharge during lamp operation will react with any atomic or molecular oxygen present in the vapor space of the lamp according to the mercury depletion mechanism described above. Therefore, to avoid mercury depletion it is critical that the phosphor layer contain no or substantially no oxygen-containing species that are unstable to cracking up to 800 to 900 to 1000° C., preferably higher temperatures. In particular, carbonates such as carbonate salts are to be avoided in the phosphor layer 16. By using a PEO thickener that is carbonate free, the presence of carbonate salts, such as calcium carbonate, are avoided in the finished phosphor layer 16.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A fluorescent lamp comprising a light-transmissive envelope having an inner surface, means for providing a discharge, a phosphor layer disposed adjacent the inner surface of said envelope, and a fill gas of mercury and an inert gas sealed inside said envelope, said phosphor layer comprising a yttria-based red emitting rare earth phosphor, said phosphor layer having 0 to less than about 0.1 weight percent calcium carbonate.

2. A fluorescent lamp according to claim 1, further comprising a barrier layer disposed between said inner surface of said envelope and said phosphor layer.

3. A fluorescent lamp according to claim 2, said barrier layer being an alumina barrier layer comprising a mixture of alpha- and gamma-alumina particles.

4. A fluorescent lamp according to claim 1, having a 1000 hour LPW maintenance of at least 97.8%.

5. A fluorescent lamp according to claim 1, having an 8000 hour LPW maintenance of at least 92.5%.

6. A fluorescent lamp according to claim 1, said phosphor layer being substantially free from carbonate salts.

7. A fluorescent lamp according to claim 1, said red emitting rare earth phosphor comprising yttrium oxide activated with ($Eu^{3+}$).

8. A fluorescent lamp comprising a light-transmissive envelope having an inner surface, means for providing a discharge, a phosphor layer disposed adjacent the inner surface of said envelope, and a fill gas of mercury and an inert gas sealed inside said envelope, said phosphor layer comprising a yttria-based red emitting rare earth phosphor, said fluorescent lamp being made by a process comprising the steps of: a) selecting phosphors, including said yttria-based red emitting rare earth phosphor, and combining said phosphors on a dry solid weight basis to form a solid phosphor mixture; b) combining said solid phosphor mixture with a quantity of water and a quantity of a non-ionizing thickener to form an aqueous phosphor slurry, said non-ionizing thickener having 0 to less than 0.2 weight percent calcium carbonate; c) coating said inner surface of said envelope or an intervening barrier layer with said aqueous phosphor slurry to provide a phosphor slurry coating thereon; and d) baking the coated envelope to vaporize or decompose the non-phosphor components of the slurry and leave behind the phosphors to provide said phosphor layer.

9. A fluorescent lamp according to claim 8, said non-ionizing thickener being polyethylene oxide.

10. A fluorescent lamp according to claim 8, said baking step being carried out at about 600° C.

11. A fluorescent lamp according to claim 8, said non-ionizing thickener being substantially free from carbonate salts.

12. A method of making a fluorescent lamp comprising the steps of: a) selecting phosphors, including a yttria-based red emitting rare earth phosphor, and combining said phosphors on a dry solid weight basis to form a solid phosphor mixture; b) combining said solid phosphor mixture with a quantity of water and a quantity of a non-ionizing thickener to form an aqueous phosphor slurry, said non-ionizing thickener having 0 to less than 0.2 weight percent calcium carbonate; c) providing a coating of said aqueous phosphor slurry on or adjacent an inner surface of a lamp envelope; and d) baking said envelope having said phosphor slurry coating to vaporize or decompose non-phosphor components of said phosphor slurry coating and leave behind the phosphors to provide said phosphor layer;

said fluorescent lamp thereby comprising a light-transmissive envelope having an inner surface and a phosphor layer disposed adjacent the inner surface of said envelope, said phosphor layer comprising a yttria-based red emitting rare earth phosphor and having 0 to less than about 0.1 weight percent calcium carbonate, said fluorescent lamp further including means for providing a discharge and a fill gas of mercury and an inert gas sealed inside said envelope.

13. A method according to claim 12, said non-ionizing thickener being polyethylene oxide having a molecular weight of at least 100,000 g/mol.

14. A method according to claim 12, said non-ionizing thickener being substantially free from carbonate salts.

15. A method according to claim 12, said baking step being carried out at about 600° C.

* * * * *